(12) United States Patent
Walker

(10) Patent No.: US 11,171,425 B2
(45) Date of Patent: Nov. 9, 2021

(54) SPHERICAL REFLECTOR ANTENNA FOR TERRESTRIAL AND STRATOSPHERIC APPLICATIONS

(71) Applicant: Arizona Board Of Regents On Behalf Of The University Of Arizona, Tucson, AZ (US)

(72) Inventor: Christopher K. Walker, Tucson, AZ (US)

(73) Assignee: Arizona Board of Regents on behalf of University of Arizona, Tucson, AZ (US)

( * ) Notice: Subject to any disclaimer, the term of this patent is extended or adjusted under 35 U.S.C. 154(b) by 589 days.

(21) Appl. No.: 15/917,427

(22) Filed: Mar. 9, 2018

(65) Prior Publication Data

US 2018/0198214 A1    Jul. 12, 2018

Related U.S. Application Data

(63) Continuation-in-part of application No. 15/744,625, filed as application No. PCT/US2016/042462 on Jul. 15, 2016.

(Continued)

(51) Int. Cl.
| | |
|---|---|
| *H01Q 15/16* | (2006.01) |
| *H01Q 21/00* | (2006.01) |
| *H01Q 21/06* | (2006.01) |
| *H01Q 19/15* | (2006.01) |
| *G01S 3/42* | (2006.01) |
| *H01Q 13/28* | (2006.01) |
| *H01Q 3/26* | (2006.01) |

(Continued)

(52) U.S. Cl.
CPC ............... *H01Q 15/16* (2013.01); *G01S 3/42* (2013.01); *H01Q 3/245* (2013.01); *H01Q 3/2605* (2013.01); *H01Q 3/36* (2013.01); *H01Q 13/28* (2013.01); *H01Q 19/15* (2013.01); *H01Q 21/0006* (2013.01); *H01Q 21/0037* (2013.01); *H01Q 21/061* (2013.01); *G01S 19/42* (2013.01); *H01Q 1/081* (2013.01)

(58) Field of Classification Search
CPC ........ H01Q 3/245; H01Q 3/2605; H01Q 3/36; H01Q 13/28; H01Q 15/16; H01Q 19/15; H01Q 21/0006; H01Q 21/0037; H01Q 21/061; G01S 3/42
USPC ......................................................... 342/422
See application file for complete search history.

(56) References Cited

U.S. PATENT DOCUMENTS 5,267,091 A * 11/1993 Chen .................... G02B 7/1828
                                                         104/281
6,963,315 B2   11/2005 Gierow et al.

(Continued)

*Primary Examiner* — Harry K Liu
(74) *Attorney, Agent, or Firm* — Blank Rome LLP

(57) ABSTRACT

A spherical reflector antenna, including a sphere with a reflective surface opposite a transparent surface, a feed system that receives electromagnetic waves that (pass through the transparent surface at a beam angle) and are reflected off the reflective surface at a beam angle and outputs electromagnetic waves that are reflected off the reflective surface (and pass through the transparent surface at a beam angle), and beam steering electronics that identify a position of the spherical reflector antenna, identify an orientation of the sphere, and adjust the beam angle of the feed system based on angle from the position of spherical reflector antenna to the target relative to the orientation of the sphere.

19 Claims, 7 Drawing Sheets

Related U.S. Application Data

(60) Provisional application No. 62/469,360, filed on Mar. 9, 2017, provisional application No. 62/469,338, filed on Mar. 9, 2017, provisional application No. 62/193,474, filed on Jul. 16, 2015.

(51) Int. Cl.
*H01Q 3/36* (2006.01)
*H01Q 3/24* (2006.01)
H01Q 1/08 (2006.01)
G01S 19/42 (2010.01)

(56) References Cited

U.S. PATENT DOCUMENTS

| | | |
|---|---|---|
| 7,764,243 B2 | 7/2010 | Gierow et al. |
| 8,319,696 B2 | 11/2012 | Clayton et al. |
| 9,276,306 B2 | 3/2016 | Clayton et al. |
| 2006/0077097 A1* | 4/2006 | Dybdal ............... H01Q 3/04 342/359 |
| 2010/0149061 A1* | 6/2010 | Haziza ............ H01Q 13/0233 343/779 |

* cited by examiner

SPHERICAL REFLECTOR ANTENNA FOR TERRESTRIAL AND STRATOSPHERIC APPLICATIONS

CROSS-REFERENCE TO RELATED APPLICATIONS

This application claims priority to U.S. Prov. Pat. Appl. Nos. 62/469,338 and 62/469,360, both filed Mar. 9, 2017, titled "Lightweight, Smart Satellite Ground Station Antenna for S- Through W-Band." This application is also a continuation-in-part of U.S. patent application Ser. No. 15/744,625, filed Jan. 12, 2018, titled "Phased Array Line Feed for Reflector Antenna," which claims priority to PCT Pat. Appl. No. PCT/US16/42462, filed Jul. 15, 2016, which claims priority to U.S. Prov. Pat. Appl. No. 62/193,474, filed Jul. 16, 2015. This application is also related to U.S. patent application Ser. No. 15/667,226, filed Aug. 2, 2017, titled "Foldable Feed Structures for Use with Reflector Antennas," which claims priority to U.S. Prov. Pat. Appl. No. 62/369,994, filed Aug. 2, 2016; and U.S. patent application Ser. No. 15/154,760, filed May 13, 2016, titled "Deployable Reflector Antenna," which claims priority to U.S. Prov. Pat. Appl. No. 62/161,033, filed May 13, 2015. All of the aforementioned patent applications are hereby incorporated by reference in their entireties.

STATEMENT REGARDING FEDERALLY SPONSORED RESEARCH

Not applicable.

BACKGROUND

High gain antennas have a number of military and civilian uses, including (secure or unsecure) point-to-point communications (to and from satellites, terrestrial devices, and stratospheric devices), synthetic aperture radar (SAR), planetary and astrophysics research, etc. In point-to-point communications applications, increasing antenna gain increases the data rates at frequencies of interest, allowing users to receive more data (e.g., higher resolution images) using devices with smaller antennas (e.g., portable and even handheld devices). In imaging applications, increasing antenna gain enables the SAR to capture images with higher resolution and better contrast (i.e., greater sensitivity) and allows higher resolution images to be transmitted in real time.

Antenna gain may be increased by increasing the diameter of the antenna. Conventional large diameter antennas, however, often have complex deployment mechanisms and, due to their mass and volume, are expensive to transport.

Antennas may be mounted on a vehicle (e.g., Humvee), surface watercraft, or aircraft (e.g., pilotless drone, manned aircraft, etc.). Additionally, buoyant antennas may be released from submarines to float to the surface of the water and establish contact with the target while tethered to the submarine. Ideally, an antenna should maintain contact with a target even as the position and/or orientation of the antenna changes.

U.S. Pat. No. 6,963,315 B2 to Gierow, et al. (hereinafter, "Gierow '315") describes an inflatable antenna 16, including a parabolic antenna dish 18 made from flexible membranes (a parabolic curved reflector membrane 21 and an RF-transparent parabolic canopy 23). The antenna membranes 21 and 23 are surrounded by an inflatable, spherically-shaped radome 20 that, in ideal conditions, pull the membranes 21 and 23 until they form a parabolic shape. However, wind and other environmental elements impacting the radome 20 can cause the antenna dish 18 to lose its parabolic shape and/or become misaligned.

U.S. Pat. No. 7,764,243 B2 to Gierow, et al. (hereinafter, "Gierow '243") describes a positioning system 10 that mechanically steers an antenna 101 (such as the inflatable antenna 16 described in Gierow '315). In the embodiment shown in FIG. 1, for example, the antenna 101 is rotated by an azimuth drive assembly 102 and an elevation drive actuator 108.

U.S. Pat. No. 8,319,696 B2 to Clayton, et al. (hereinafter, "Clayton '696") describes a positioning system 10 for an inflatable antenna 19 (such as the inflatable antenna 16 described in in Gierow '315) that includes four anchor lines 14a-14d that engage the bracket members 12a and 12b attached to the surface of the spherical antenna 19. Each bracket member 12a and 12b includes a drive rod 17a or 17b that, when rotated together, raise or lower the spherical antenna 19 in the vertical plane and, when rotated in opposite directions, spin the spherical antenna 19 in the azimuth plane.

U.S. Pat. No. 9,276,306 B2 to Clayton, et al. (hereinafter, "Clayton '306") describes a self-contained system 100, housed in a portable case 401, that automatically deploys an inflatable antenna 101 (such as the inflatable antenna 16 described in in Gierow '315) with little-to-no user action necessary. The system 100 includes an azimuth motor 110 for positioning the antenna 101 in the azimuth plane and an elevation motor 111 for positioning the antenna 101 in the vertical plane.

Gierow '315, Gierow '243, Clayton '696, and Clayton '306 each describe a parabolic antenna that is mechanically steered by rotating the parabolic antenna.

Prior art antennas that are mechanically steered cannot be steered fast enough to correct for changes in the position and/or orientation of the antenna. In order to maintain communication with a target as an antenna is disrupted, parabolic antennas may be used as low gain antennas with broad beams. Spreading out the antenna beam, however, reduces the amount of power delivered to the target, thereby reducing bandwidth. Additionally, in secure communications and clandestine operations, wide antenna beams are problematic because they are easier to detect and intercept.

Accordingly, there is a need for a high gain antenna that can establish and maintain contact with a target during terrestrial and stratospheric applications, even when the position and/or orientation of the antenna changes.

SUMMARY

In order to overcome those and other drawbacks with prior art antennas, there is provided a spherical reflector antenna that includes a sphere with a reflective surface opposite a transparent surface, a feed system that receives electromagnetic waves that (pass through the transparent surface at a beam angle) and are reflected off the reflective surface at a beam angle and outputs electromagnetic waves that are reflected off the reflective surface (and pass through the transparent surface at a beam angle), and beam steering electronics that identify a position of the spherical reflector antenna, identify an orientation of the sphere, and adjust the beam angle of the feed system based on the angle from the position of the spherical reflector antenna to the target relative to the orientation of the sphere.

The spherical reflector antenna may repeatedly update the position of the spherical reflector antenna and the orientation of the sphere and adjust the beam angle based on the updated position and orientation. Accordingly, the spherical reflector antenna is able to maintain contact with a target, even as the position and/or orientation of the antenna changes.

The spherical reflector antenna may also actively steer the beam based on power levels of signals received from the target. Accordingly, even if the trajectory of the target (for example, an aircraft flying overhead) is not known in advance or even predictable, the spherical reflector antenna is able follow the trajectory of the target and steer the beam to compensate for that trajectory.

BRIEF DESCRIPTION OF THE DRAWINGS

Aspects of exemplary embodiments may be better understood with reference to the accompanying drawings. The components in the drawings are not necessarily to scale, emphasis instead being placed upon illustrating the principles of exemplary embodiments, wherein.

DETAILED DESCRIPTION

Figure 1:
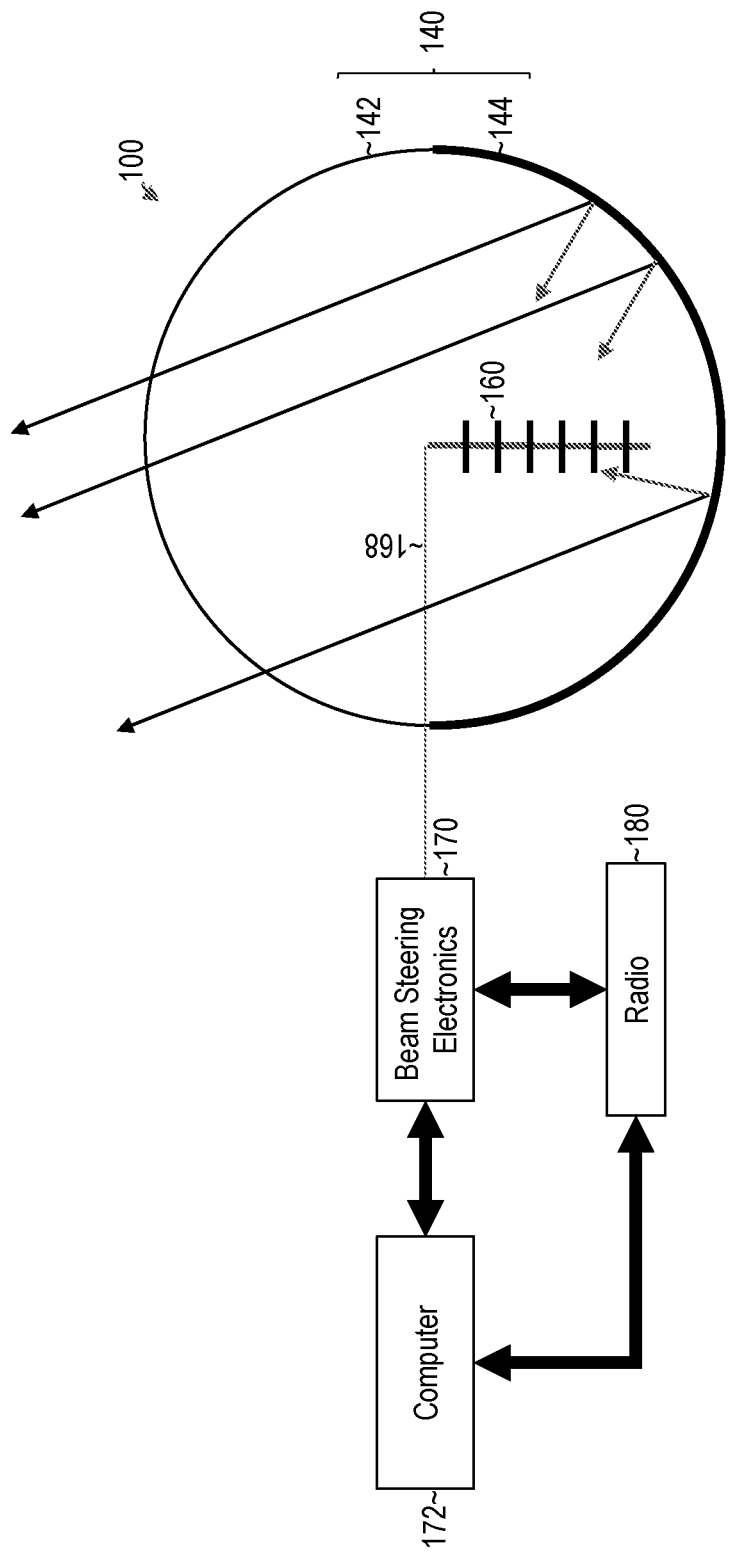
FIG. 1 is a diagram illustrating a spherical reflector antenna according to an exemplary embodiment.

Preferred embodiments are set forth in detail with reference to the drawings, in which like reference numerals refer to like elements or steps throughout.

FIG. 1 is a diagram illustrating a spherical reflector antenna 100 according to an exemplary embodiment.

As shown in FIG. 1, the spherical reflector antenna 100 includes a sphere 140 with a surface transparent to electromagnetic waves 142 and a reflective surface 144 opposite the transparent surface 142, a feed system 160, beam steering electronics 170, and a radio 180. The beam steering electronics 170 may include a computer 172. When the spherical reflector antenna 100 transmits a signal, the signal is emitted by the feed system 160 and encounters the reflective surface 144, which directs the signal through the transparent surface 142. When the spherical reflector antenna 100 receives a signal, the signal passes through the transparent surface 142 and encounters the reflective surface 144, which focuses the signal into the feed system 160.

The feed system 160 may be any suitable device that receives electromagnetic waves that are reflected off the reflective surface 144 or emits electromagnetic waves that are reflected off the reflective surface 144. For example, the feed system 160 may include one or more feedhorns (e.g., as described in U.S. patent application Ser. No. 15/667,226), one or more planar antennas, one or more spherical correctors such as a quasi-optical spherical corrector or one or more line feeds (as illustrated in FIG. 1), etc. The line feed may be a pivoting line feed (e.g., as described in U.S. patent application Ser. No. 15/154,760), an electronically steerable line feed (e.g., as described in PCT Pat. Appl. No. PCT/US16/42462), a collapsible line feed (e.g., as described in U.S. patent application Ser. No. 15/667,226), etc. The feed system 160 may extend from the center of the sphere 140 along one or more radial lines of the sphere 140. In the preferred embodiment described in detail below with reference to FIGS. 2A-2B and 5, the feed system 160 includes three electronically steerable phased array line feeds.

The beam steering electronics 170 may be any suitable device that steers the antenna beam, either by pivoting the feed system 160 or electronically steering the beam as described below. The computer 172 may be any suitable computing device which controls the beam steering electronics 170 as described below.

The radio 180 may be any suitable electronic device that outputs signals to the feed system 160 for transmission and/or receives signals received by the feed system. The radio 180 outputs signals to the feed system 160 and receives signals from the feed system 160 via the one or more signal lines 168. The one or more signal lines 168 may include, for example, one or more coaxial cables.

In a preferred embodiment, the sphere 140 may have a 1 meter diameter reflective surface 144 that yields a 2 degree beam at X-band frequencies (i.e., 8.0 to 12.0 gigahertz). At X-band frequencies, the support uplink and downlink data rates of the spherical reflector antenna 100 may be between 3 and 50 megabits per second (or more, depending on balloon reflector diameter and transmitter power) for Ethernet-like connections. In other embodiments, the sphere may be other sizes, from the size of a beach ball to up to 3 meters (for operating at 115 GHz in the W-band). In addition to X-band communications, the spherical reflector antenna 100 may provide high bandwidth communications at frequencies in the S-band to the W-band.

The transparent surface 142 may be any material with a low absorption rate (e.g., less than 1 percent) at the wavelength of interest. The reflective surface 144 may be any suitable material that reflects electromagnetic waves at the wavelength of interest. For example, the reflective surface 144 may be an approximately 0.5 micron (e.g., 0.5 micron±0.1 micron) metallic coating applied to the material that forms the transparent surface 142. The metallic coating is applied to an area on one hemisphere of the sphere 140. The reflective surface 144 may be an entire hemisphere of the sphere 140 opposite the transparent surface 142. The metallic coating may be applied to the inside surface of the sphere 140 to form the reflective surface 144. If the transparent surface 142 is thin (as well as transparent), the metallic coating may be applied to the outside surface of the sphere 140 to form the reflective surface 144.

In most embodiments, in order to overcome some of the problems with prior art inflatable antennas, the sphere 140 may be rigid. In limited instances, however, it may be beneficial for the sphere 140 to be collapsible and inflatable so that the spherical reflector antenna 100 can be deflated and carried in a small package. In collapsible and inflatable embodiments, the transparent surface 142 may be a flexible polymer such as an approximately 0.5 mil thick Mylar skin (e.g., a 0.5 mil±1 mil Mylar skin). A collapsible sphere 140 may be inflated using a pump or even by mouth. A spherical reflector antenna 100 may or may not include beam steering electronics 170. The feed system 160 of a spherical reflector antenna 100 with a collapsible sphere 140 may also be collapsible, such the collapsible vee antennas or line feed described in U.S. patent application Ser. No. 15/667,226. The collapsible sphere 140 may also include one or more dielectric support curtains to keep the spherical shape, as described in U.S. patent application Ser. No. 15/667,226.

The reflective surface 144 may be contiguous or substantially contiguous. Notably, the reflective surface 144 is limited to one of the two hemispheres of the sphere 140. For ground based applications, including applications where the spherical reflector antenna 100 is mounted on a vehicle or watercraft or floats on the surface of a body of water, the transparent surface 142 is preferably the top hemisphere of the sphere 140 and the reflective surface 144 is preferably the bottom hemisphere. In those applications, the feed system 160 may extend from the center of the sphere 140 along one or more radial lines towards the bottom hemisphere. For that reason, the feed system 160 is described below as extending toward the bottom hemisphere or ground. However, the sphere 140 may be oriented in any direction, especially in aerial and stratospheric applications.

Figure 2A:
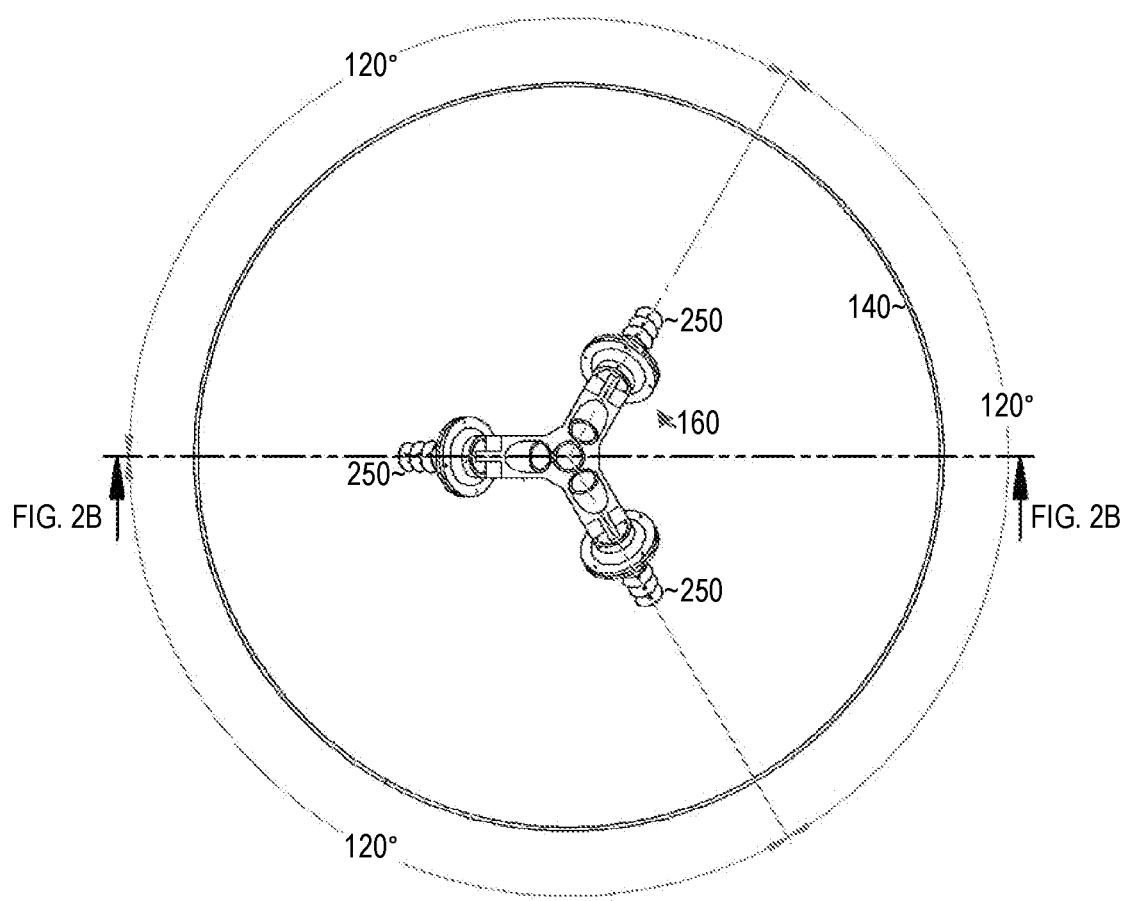
FIG. 2A is a drawing of a top-down view of a feed system according to a preferred embodiment.
Figure 2B:
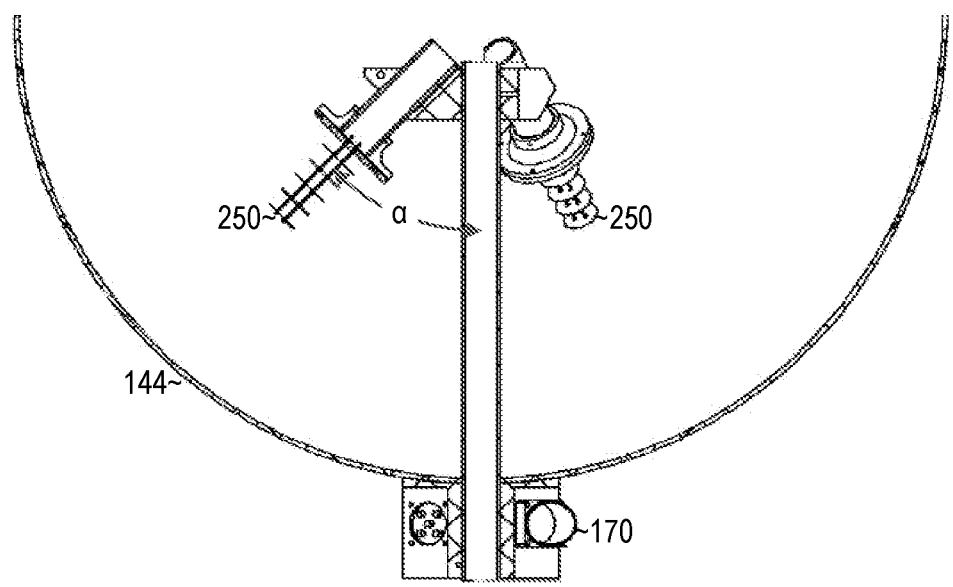
FIG. 2B is a diagram of a side view of the feed system according to the preferred embodiment.

FIG. 2A is a drawing of a top-down view of the feed system 160 according to a preferred embodiment. FIG. 2B is a drawing of a side view of the feed system 160 according to the preferred embodiment.

As shown in FIG. 2A, the feed system 160 includes three phased array line feeds 260 extending from the center of the sphere 140 at 120 degree increments along the circumference of the sphere. As shown in FIG. 2B, each of the phased array line feeds 260 may be arranged at an angle α from the center axis of the sphere 140. The angle α may be 30-40 degrees.

Figure 3:
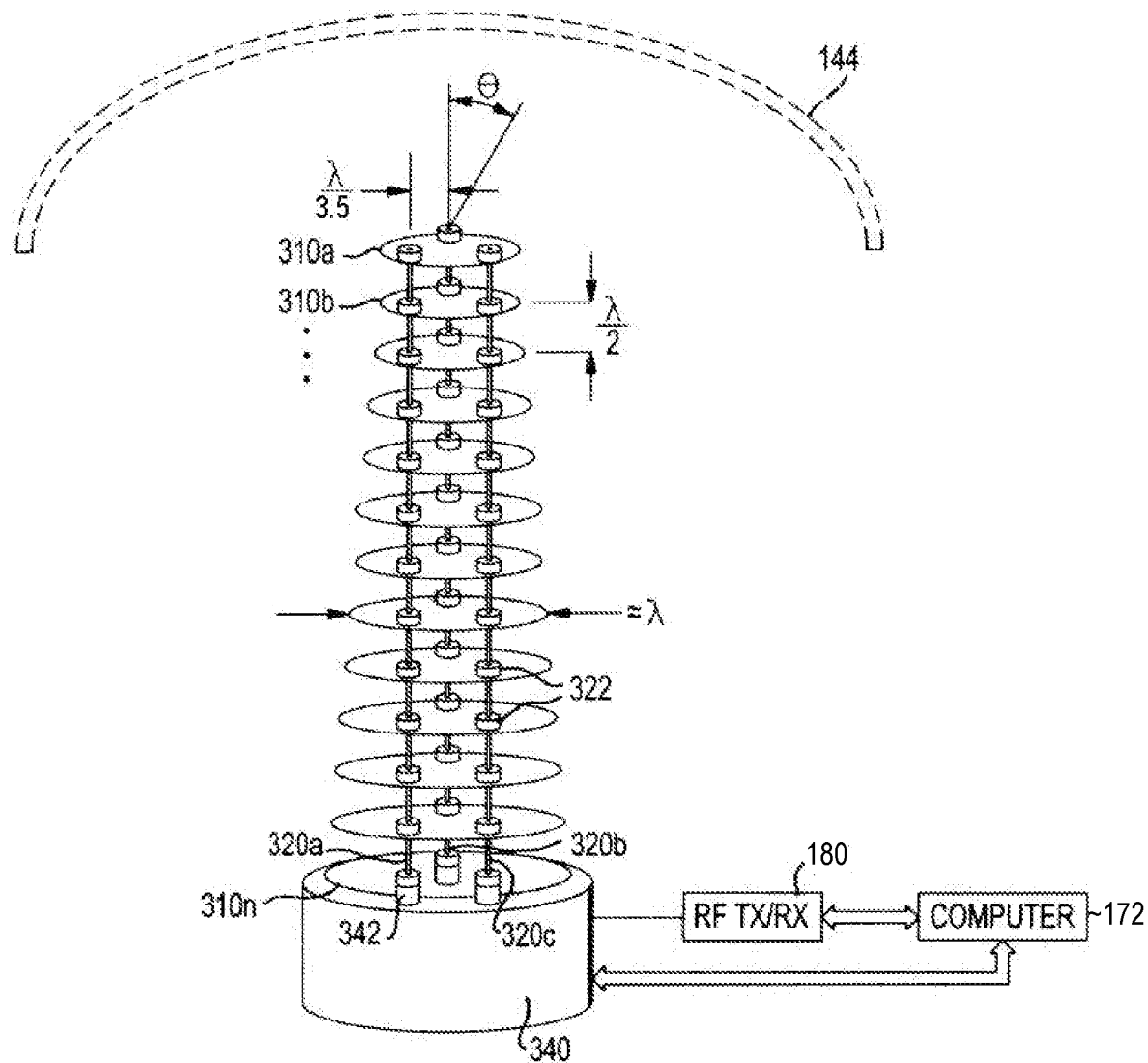
FIG. 3 is a diagram illustrating a phased array line feed according to an exemplary embodiment.

FIG. 3 is a diagram illustrating one of the phased array line feeds 260 that operates at a wavelength of interest λ according to an exemplary embodiment.

As shown in FIG. 3, the phased array line feed 260 includes a plurality of (e.g., 3 or more) metallic rods 320a-320c and a phase/power switching matrix 340. The phase/power switching matrix 340 is electrically connected to each of the metallic rods 320a-320c, for example via coaxial connectors 342. The phased array line feed 260 may also include a plurality of metallic disks 310a-310n. The metallic rods 320a-320c may pass through the metallic discs 310a-310n, for example via coaxial feedthroughs 322.

The metallic disks 310a-310n are substantially parallel. The metallic rods 320a-320c may be arranged in a circular pattern (embodiments with three metallic rods 320a-320c, for example, may form a triangular pattern). At the base of the phased array line feed 260, the metallic rods 320a-320c may be separated by a distance of approximately λ/3.5 center-to-center. The metallic rods 320a-320c may be substantially parallel and pass through each of the metallic disks 310a-310n substantially perpendicular to the metallic disks 310a-310n. For example, the rods may be angled inward at an angle of approximately 1 degree (e.g., 1 degree±0.1 degree).

In embodiments that include metallic discs 310a-310n, the metallic discs 310a-310n divide the phased array line feed 260 into a series of independent subarrays of λ/2 vertical antennas. In essence, each of the metallic discs 310a-310n acts as a ground plane for each of the subarrays. The emergent beam angle θ from each subarray is a function of the phasing within each subarray and the diameter of the metallic discs 310a-310n separating the subarrays. Illumination of a spherical reflector requires the emergent beam angle θ to vary along the length of the phased array line feed 260 with the largest emergent beam angle θ occurring at the end of the feed closest to the reflective surface 144. In the embodiment shown in FIG. 3, the emergent beam angle θ varies along the length of the line feed, for example from 19 degrees to 64 degrees.

Compared to a conventional, stationary line feed, the length of the phased array line feed 260 may be extended to intercept off-axis reflected rays that would otherwise be missed by the conventional line feed. To achieve scan angles of ±30 degrees, the length of the line feed may be approximately 12 percent (e.g., 12±1 percent) of the diameter of the spherical reflector being illuminated (e.g., the reflective surface 144).

In the embodiment illustrated in FIG. 3, the metallic disks 310a-310n may be equally spaced along the length of the metallic rods and the diameter of the metallic disks may decrease from the base to the vertex of the line feed. For example, the metallic disks 310a-310n may be separated by a distance of approximately λ/2 (e.g., λ/2±0.13) and the metallic discs may have a diameter of approximately λ/1.1 at the base of the line feed to approximately λ/1.8 at the vertex.

Figure 4:
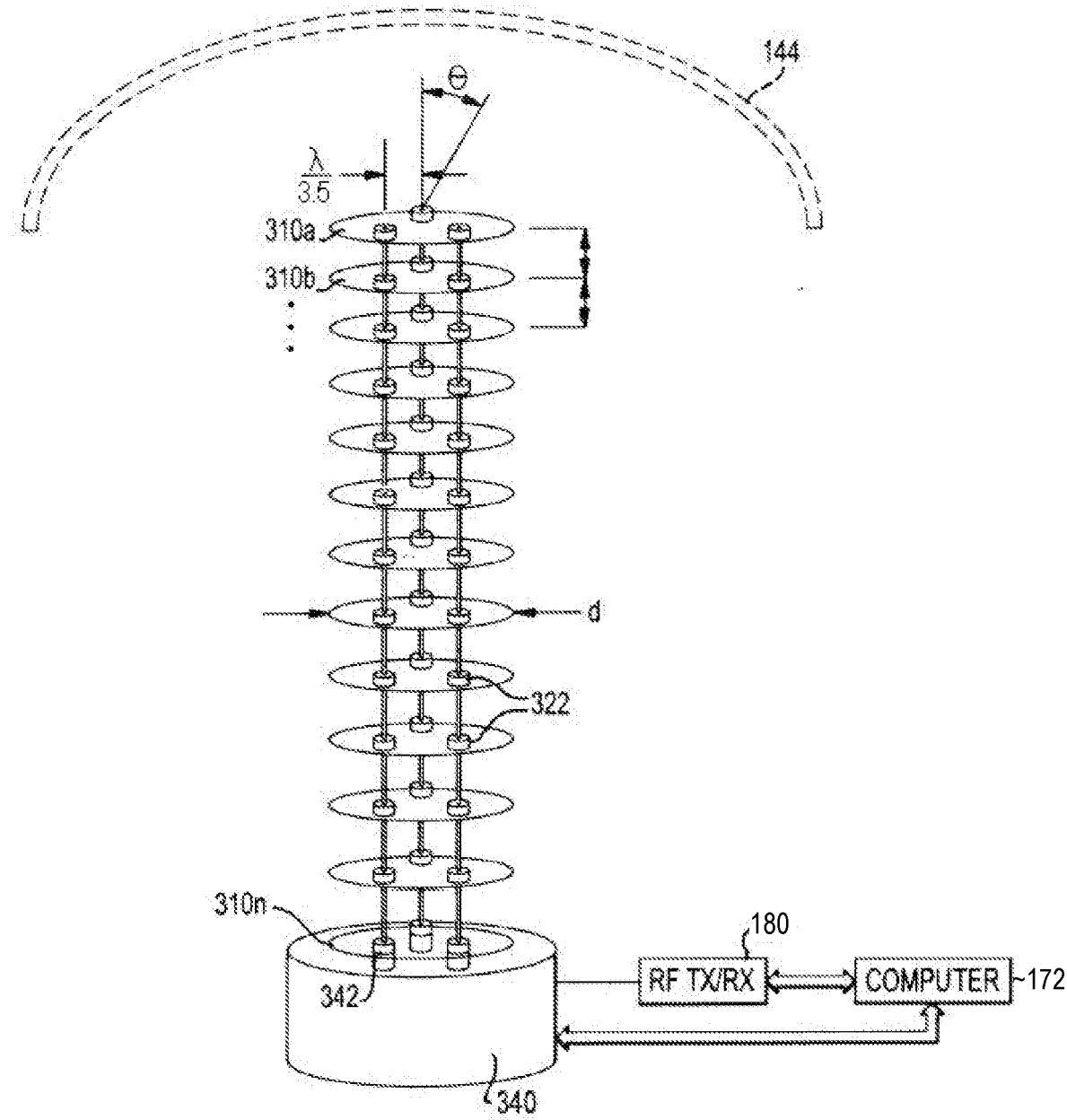
FIG. 4 is a diagram illustrating a phased array line feed according to another exemplary embodiment.

FIG. 4 is a diagram illustrating a phased array line feed 260' that operates at a wavelength of interest λ according to another exemplary embodiment.

Similar to the phased array line feed 260 illustrated in FIG. 3, the phased array line feed 260' includes a plurality of (e.g., 3 or more) substantially parallel metallic rods 320a-320c and a phase/power switching matrix 340 electrically connected to each of the metallic rods 320a-320c (e.g., via coaxial connectors 342). The phased array line feed 260' may also include a plurality of substantially parallel metallic disks 310a-310n. The metallic rods 320a-320c may pass through the metallic disks 310a-310n (e.g., via coaxial feedthroughs 322) perpendicular to the metallic disks 310a-310n. Again, the length of the phased array line feed 260' may be extended to approximately 12 percent (e.g., 12±1 percent) of the diameter of the spherical reflector being illuminated (e.g., the reflective surface 144) to intercept off-axis reflected rays.

In the embodiment illustrated in FIG. 4, diameters d of the metallic disks 310a-310n may be substantially equal. Similar to the phased array line feed 260 of FIG. 3, the metallic discs 310a-310n divide the phased array line feed 260' of FIG. 4 into a series of independent subarrays of λ/2 vertical antennas. In order for the emergent beam angles θ from each subarray to vary along the length of the phased array line feed 260' (e.g., from 19 degrees to 64 degrees), the distances between the metallic disks 310a-310n decrease from the base of the phased array line feed 260' to the vertex of the phased array line feed 260'.

Each of the phased array line feeds 260 and 260' create an electronically steerable beam that illuminates the surface of the reflector antenna (e.g., the reflective surface 144) without rotating the phased array line feed 260 or 260'. The phase/power switching matrix 340 steers the beam by adjusting the phase and/or power difference between the metallic rods 320a-320c.

A mathematical description of the resulting beam pattern from the phased array line feed 260 or 260' can be derived using the principle of pattern multiplication. Assuming the geometry of each radiating element in the array (here, a metallic rod 320 with metallic disks 310) is the same, then the combined radiation pattern may be prescribed, for example, by Equation 1:

$$f_a(\theta, \phi) = f_0(\theta, \phi) \sum_{n=1}^{N} V_n e^{jkd_n \sin\theta \cos\phi} \quad \text{Eq. 1}$$

where $f_a(\theta,\phi)$=resulting radiation pattern
$f_0(\theta,\phi)$=common radiation pattern of each array element
$V_n=A_n e^{j\alpha_n}$=complex excitation to each element
$A_n$=signal amplitude at each element
$\alpha_n$=phase at each element
$d_n$=element spacing relative to center of array
$k=2\pi/\lambda$=propagation constant
$\theta$=polar angle
$\phi$=azimuthal angle
$\lambda$=wavelength of operation
n=element number (e.g., 1, 2, 3, etc.)

The above expression for $f_a(\theta,\phi)$ may also be presented in vector form as shown, for example, in Equation 2. The normalized power pattern, $P_n(\theta,\phi)$, of the array is then:

$$P_n(\theta, \phi) = \frac{|f_a(\theta, \phi)|^2}{|f_{max}|^2} \quad \text{Eq. 2}$$

where $f_{max}$=maximum value of $f_a(\theta,\phi)$.

Figure 5:
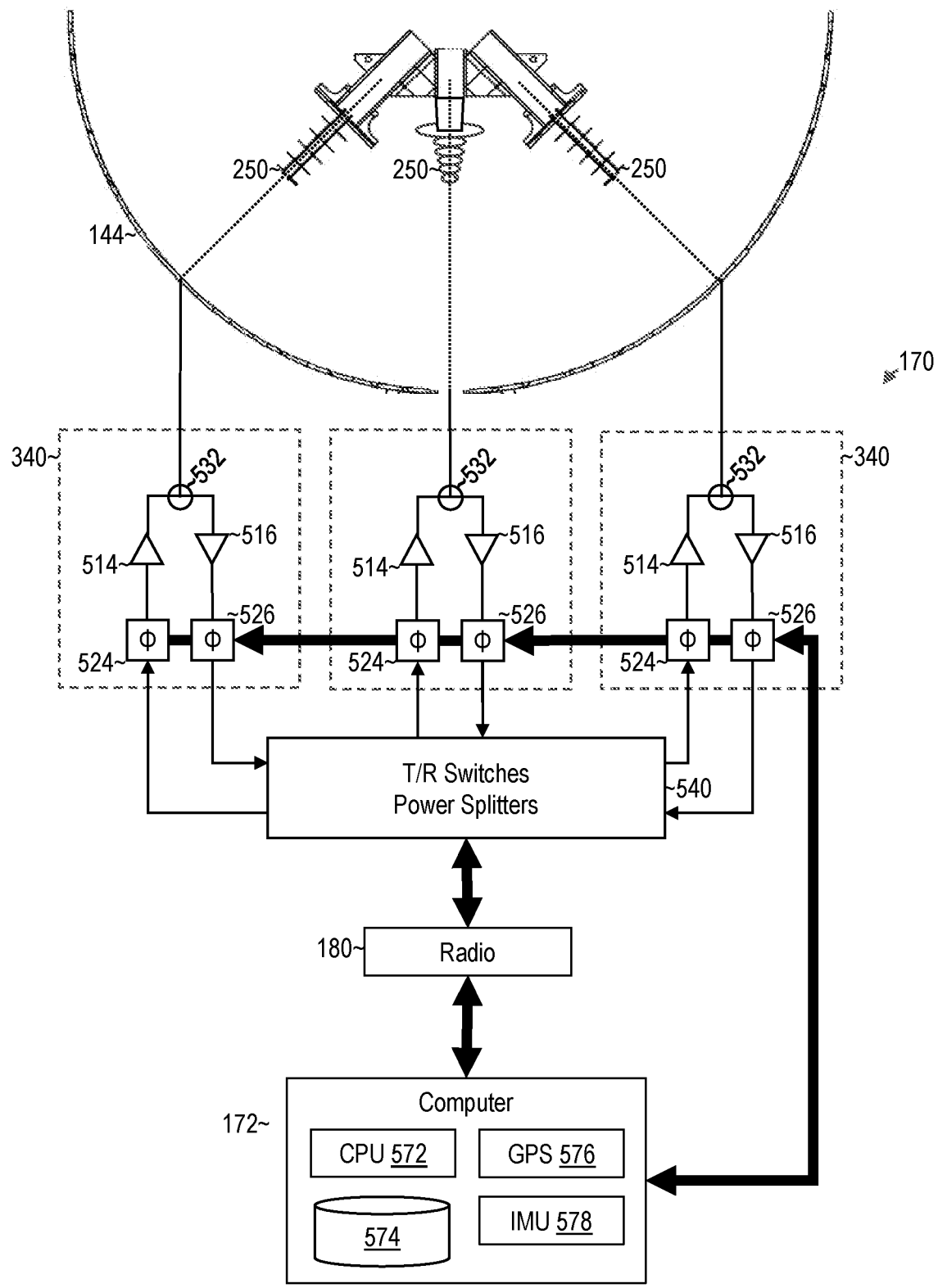
FIG. 5 is a diagram illustrating beam steering electronics according to an exemplary embodiment.

FIG. 5 is a diagram of the beam steering electronics 170 according to an exemplary embodiment.

In the preferred embodiment, the feed system 160 includes three phased array line feeds 260 extending from the center of the sphere 140 toward the reflective surface 144. Each of the phased array line feeds 260 has a corresponding phase/power switching matrix 340. (Though not shown in the diagram, each phase/power switching matrix 340 may be inside the sphere, for example at the base of the corresponding phased array line feed 260.) Each phase/power switching matrix 340 may include a power amplifier 514, a low noise amplifier 516, two phase shifters 524 and 526, and a diplexer 532.

Each power amplifier 514 amplifies transmission signals before they are transmitted by the corresponding phased array line feed 260. The low noise amplifier 516 amplifies signals received by the corresponding phased array line feed 260. The phase shifters 524 and 526 shift the phase of the metallic rods to steer the beam. The diplexer 532 separates two different frequency bands in the receive path and combines them in a transmit path.

Outside the sphere 140, the beam steering electronics 170 may include transmit/receive switches and power splitters 540 and the computer 172. The computer 172 may include a processing unit 572 (e.g., a central processing unit) and nontransitory computer readable storage media 574 (e.g., a hard disk, solid state memory, etc.). The computer 172 may also include a global positioning satellite (GPS) receiver 576 and an inertial measurement unit (IMU) 578.

The transmit/receive switches and power splitters 540 switch between the phased array line feeds 260 or divide power between them, in order to steer the beam. With three phased array line feeds 260 arranged as shown in FIGS. 2A-2B and 5, the spherical reflector antenna 100 is able to steer the beam in any direction, nearly horizon to horizon (i.e., in any direction approximately 5 degrees above the azimuth axis of the sphere 140). Furthermore, because the phased array line feeds 260 are electronically steerable, the spherical reflector antenna 100 is able to acquire and maintain contact with a target, even while the spherical reflector antenna 100 and/or the target is moving.

The computer 172 controls the phase shifters 524 and 526 and the transmit/receive switches and power splitters 540. The computer readable storage media 578 may store instructions that, when executed by the processing unit 572, cause the computer 172 to perform the processing steps to control the beam steering electronics 170 as described below.

The GPS receiver 576 may be any electronic device that receives information from GPS satellites and calculates the position of the spherical reflector antenna 100. The GPS receiver 576 may calculate the location on the globe (e.g., longitude and latitude). For stratospheric applications, the GPS receiver 576 may also calculate altitude. Alternatively, the computer 172 may also include pressure sensors (not shown) that calculate altitude.

The inertial measurement unit 578 may be any electronic device that calculates the orientation of the sphere 140 relative to the Earth's surface (e.g., pitch, roll and yaw). The inertial measurement unit 578, for example, may use gyroscopes and/or a magnetometer to calculate the orientation of the sphere 140.

For satellite communication, the computer readable storage media 578 may include a lookup table of satellite locations (i.e., azimuth and elevation) at each point in time. The computer 172 may determine the time using a clock (not shown). The lookup table may also include information identifying each of the satellites. The computer 172 may include a user interface that identifies the satellites that are in view and provides functionality for the user to select one of the satellites that are in view. The spherical reflector antenna 100 may also identify an additional satellite not included in the lookup table (for example, by performing a spiral search) and the computer 172 may provide functionality for the user to select the additional satellite. Additionally, the computer 172 may store the current and predicted location of the additional satellite in the computer readable storage media 574 and provide functionality for the user to communicate with the additional satellite in the future.

Using the position of the spherical reflector antenna 100 received from the GPS receiver 576, the processing unit 572 calculates the beam angle towards the known location of a target relative to the orientation of the sphere 140 received from the inertial measurement unit 578. The processing unit 572 then steers the beam by controlling the transmit/receive switches and power splitters 540 to select one of the phased array line feeds 260 or divide power between them and adjusts the phase shifters 514 and 516 to steer the beam(s) of the individual phased array line feed(s) 260. (The computer readable storage media 574 stores another lookup table with settings for the transmit/receive switches and power splitters 540 and the phase shifters 514 and 516 for each azimuth and elevation of the beam.)

As described above, prior art antennas that are mechanically steered cannot be steered fast enough to compensate for changes in position and/or orientation of an antenna with a beam narrow enough to have a high gain. By contrast, even if the position of the spherical reflector antenna 100 and/or the orientation of the sphere 140 changes, the computer 172 is able to steer the beam of the electronically steerable feed system 160 to compensate for the movement of the spherical reflector antenna 100.

Figure 6:
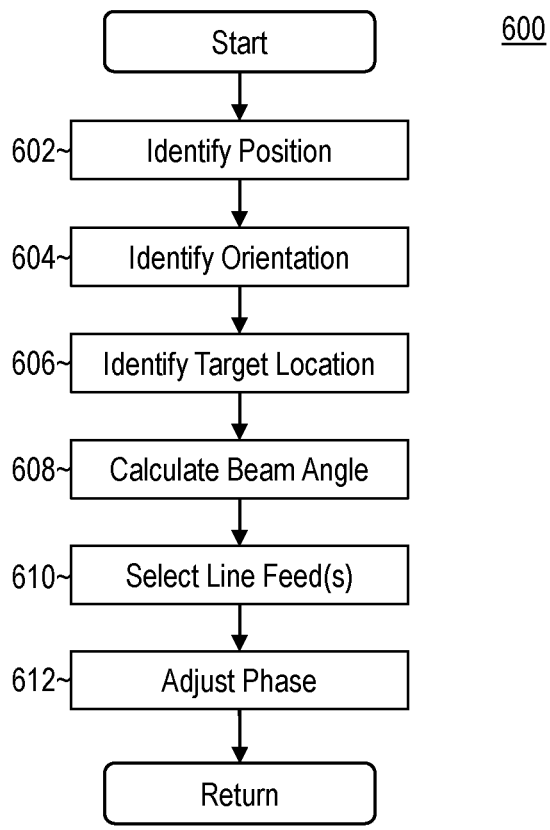
FIG. 6 is a flowchart illustrating a target acquisition process for electronically steering the spherical reflector antenna toward a target according to an exemplary embodiment.

FIG. 6 is a flowchart illustrating a target acquisition process 600 for electronically steering the spherical reflector antenna 100 toward the known location of a target according to an exemplary embodiment.

The position of the spherical reflector antenna 100 is identified in step 602. The position of the spherical reflector antenna 100 may be calculated, for example, by the GPS receiver 576 based on information from GPS satellites.

The orientation of the sphere 140 is determined in step 604. The orientation of the sphere 140 may be calculated, for example, by the inertial measurement unit 578.

A target location is identified in step 606. The target location may be determined, for example, using a lookup table of satellite locations (i.e., azimuth and elevation) at each point in time. The target satellite may be selected by the user via a user interface.

In step 608, using the position of the spherical reflector antenna 100 identified in step 602, the beam angle (i.e., azimuth and elevation) towards the location of the target identified in step 606 is calculated relative to the orientation of the sphere 140 identified in step 604.

Using the beam angle calculated in step 608, one or more phased array line feeds 260 are selected in step 610. (If more than one phased array line feeds 260 are selected, power is divided between the selected phased array line feeds 260 based on the beam angle.)

Further using the beam angle calculated in step 608, the phase shifters 524 and 526 of the selected phased array line feed(s) 260 are adjusted in step 612.

The target acquisition process 600 is repeated so that the position of the spherical reflector antenna 100 and the orientation of the sphere 140 are recalculated in steps 602 and 604, the location of the target updated in step 606, beam angle is adjusted in step 608, and the beam is steered in steps 610 and 612.

By repeating the target acquisition process 600, the spherical reflector antenna 100 may seamlessly communicate with a satellite network even as individual satellites in the satellite network leave the field of view. For example, if the target previously identified in step 606 is a satellite that is no longer in view, the computer 172 may select another satellite in the constellation in step 606, recalculate the beam angle in step 608, and steer the beam toward the new target in steps 610 and 612.

In addition to automatically acquiring a target with a known location as described in the target acquisition process 600, the spherical reflector antenna 100 may use feedback from a target to track the movement of the target and maintain contact with that target (regardless of whether the original location of the target was known).

Figure 7:
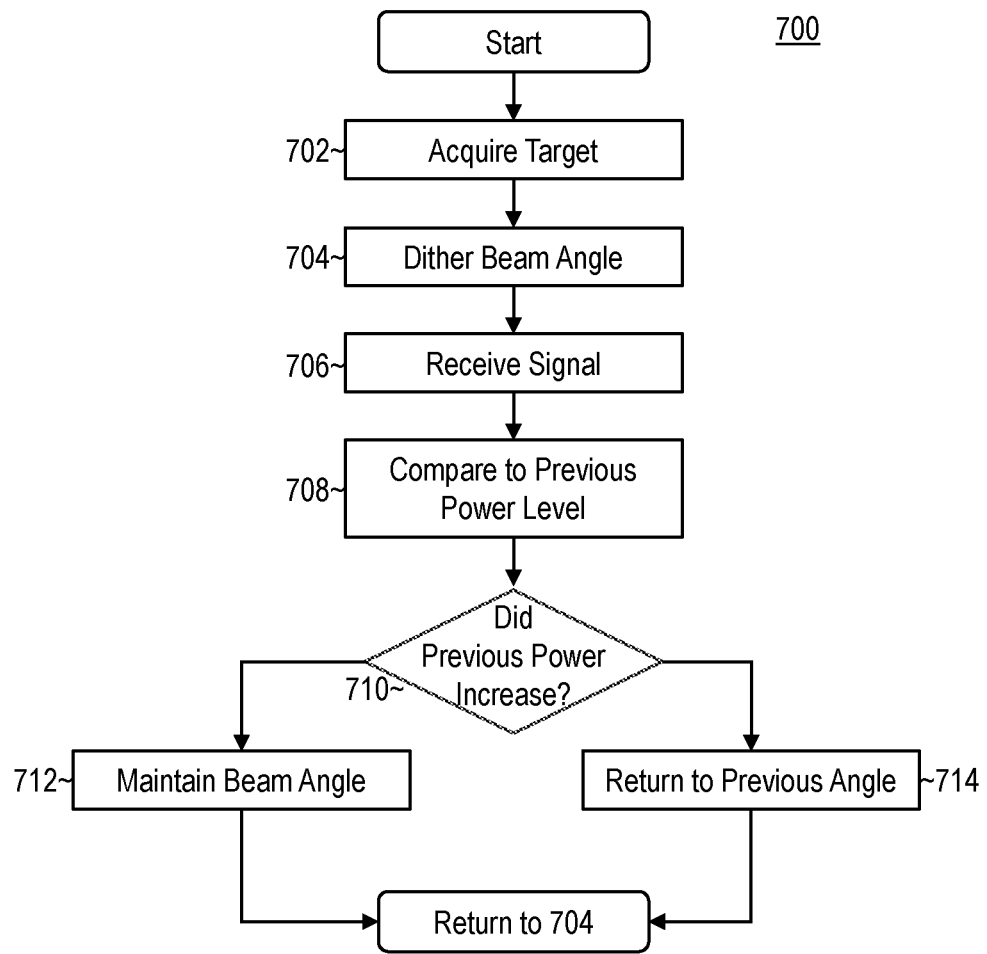
FIG. 7 is a flowchart illustrating an active steering process for tracking a target and maintaining contact with that target according to an exemplary embodiment.

FIG. 7 is a flowchart illustrating an active steering process 700 for tracking a target and maintaining contact with that target according to an exemplary embodiment.

A target is acquired in step 702. The target may be acquired using the target acquisition process 600 or any other method.

The beam angle is adjusted in step 704. The beam angle is adjusted such that the target is still within the width of the beam, but that the center of the beam is slightly to the side (or above or below) the previously determined location of the target.

The signal is received from the target in step 706.

In step 708, the power level of the signal received in step 706 is compared to the power level of the signal before the beam angle was adjusted in step 704.

In step 710, it is determined whether the power level increased after the beam angle was adjusted in step 706. If so (step 710: Yes), the adjusted beam angle is maintained. If not, (step 710: No), the beam angle is returned to the beam angle before it was adjusted in step 706.

Steps 704 through 714 are repeatedly performed, meaning the beam angle is repeatedly adjusted in step 704. The beam angle may be adjusted, for example, in a spiral pattern around the previously determined location of the target (using the target acquisition process 600 or by other means).

Even if the trajectory of the target (for example, an aircraft flying overhead) is not known in advance or even predictable, repeatedly performing the active steering process 700 enables the spherical reflector antenna 100 to follow the trajectory of the target and steer the beam to compensate for that trajectory.

The computer 172 may perform the active steering process 700 in addition to adjusting the beam angle based on changes in the orientation and position of the spherical reflector antenna 100 as described above.

The foregoing description and drawings should be considered as illustrative only of the principles of the inventive concept. Exemplary embodiments may be realized in a variety of sizes and are not intended to be limited by the preferred embodiments described above. Numerous applications of exemplary embodiments will readily occur to those skilled in the art. Therefore, it is not desired to limit the inventive concept to the specific examples disclosed or the exact construction and operation shown and described. Rather, all suitable modifications and equivalents may be resorted to, falling within the scope of this application.

What is claimed is:

1. A spherical reflector antenna, comprising:
   a sphere with a first hemisphere comprising a transparent surface and a second hemisphere, opposite the first hemisphere, comprising a reflective surface;
   a feed system that:
      receives electromagnetic waves that pass through the transparent surface at a beam angle and are reflected off the reflective surface; and
      outputs electromagnetic waves that are reflected off the reflective surface and pass through the transparent surface at the beam angle; and
   beam steering electronics that:
      identify a position of the spherical reflector antenna;
      identify an orientation of the sphere; and
      adjust the beam angle of the feed system based on the angle from the position of the spherical reflector antenna to a position of a target relative to the orientation of the sphere.

2. The spherical reflector antenna of claim 1, wherein the beam steering electronics repeatedly:
   identifies the position of the spherical reflector antenna;
   identifies the orientation of the sphere; and
   adjusts the beam angle of the feed system based on the angle from the position of the spherical reflector antenna to the position of the target relative to the orientation of the sphere.

3. The spherical reflector antenna of claim 1, wherein:
   the target is a satellite;
   the beam steering electronics store satellite locations at each point in time; and
   the beam steering electronics determine the position of the target based on the current time and the stored satellite locations.

4. The spherical reflector antenna of claim 3, wherein the beam steering electronics:
   determines that the satellite is leaving the field of view;
   identifies a position of a second satellite based on the stored satellite locations; and
   adjusts the beam angle of the feed system based on the position of the second satellite.

5. The spherical reflector antenna of claim 1, wherein the beam steering electronics repeatedly adjusts the beam angle based on power levels of electromagnetic waves received from the target.

6. The spherical reflector antenna of claim 5, wherein the beam steering electronics adjusts the beam angle by repeatedly:
- receiving a first signal from a target at a first power level;
- adjusting the beam angle;
- receiving a second signal from the target at a second power level;
- determining if the second power level is greater than the first power level; and
- maintaining or further adjusting the beam angle based on the determination.

7. The spherical reflector antenna of claim 6, wherein:
the first signal is received from the target while the feed system is at a first beam angle;
the second signal is received from the target while the feed system is at a second beam angle; and
the beam steering electronics maintains or further adjusts the beam angle by:
- maintaining the second beam angle in response to a determination that the second power level is greater than the first power level; or
- returning the beam angle to the first beam angle in response to a determination that the second power level is less than the first power level.

8. The spherical reflector antenna of claim 1, wherein:
the reflective surface has a line of focus; and
the feed system extends along one or more radial lines from a center of the sphere and receives electromagnetic waves along the line of focus.

9. The spherical reflector antenna of claim 1, wherein the sphere is collapsible.

10. The spherical reflector antenna of claim 1, wherein the sphere is rigid.

11. The spherical reflector antenna of claim 1, wherein the feed system comprises one or more phased array line feeds.

12. The spherical reflector antenna of claim 11, wherein the beam steering electronics steers the beam by adjusting the phases of the one or more phased array line feeds.

13. The spherical reflector antenna of claim 1, wherein the feed system comprises three phased array line feeds.

14. The spherical reflector antenna of claim 13, wherein the beam steering electronics steers the beam by:
selecting one or more of the phased array line feeds; and
adjusting the phases of the one or more phased array line feeds.

15. The spherical reflector antenna of claim 14, wherein, if two or more of the phased array line feeds are selected, the beam steering electronics further steers the beam by dividing power between the two or more phased array line feeds.

16. A method of steering a beam angle of a spherical reflector antenna, the method comprising:
providing a spherical reflector antenna comprising a sphere and a feed system, the sphere comprising a first hemisphere and a second hemisphere opposite the first hemisphere, the first hemisphere comprising a transparent surface, the second hemisphere comprising a reflective surface, the feed system being configured to receive electromagnetic waves that pass through the transparent surface at the beam angle and are reflected off the reflective surface and output electromagnetic waves that are reflected off the reflective surface and pass through the transparent surface at the beam angle;
identifying a position of the spherical reflector antenna;
identifying an orientation of the sphere; and
adjusting the beam angle of the feed system based on the angle from the position of the spherical reflector antenna to a target relative to the orientation of the sphere.

17. The method of claim 16, further comprising:
repeatedly adjusting the beam angle based on a power level of the electromagnetic waves received from the target.

18. The method of claim 16, wherein the target is a satellite, the method further comprising:
storing satellite locations at each point in time; and
determining position of the target based on the current time and the stored satellite locations.

19. The method of claim 16, further comprising repeatedly:
identifying the position of the spherical reflector antenna;
identifying the orientation of the sphere; and
adjusting the beam angle of the feed system based on the angle from the position of the spherical reflector antenna to the position of the target relative to the orientation of the sphere.

* * * * *